United States Patent [19]

Evans

[11] 4,187,748
[45] Feb. 12, 1980

[54] AUTOMATIC MACHINE TOOL

[76] Inventor: Richard F. Evans, 36 School La., Solihull, West Midlands, England

[21] Appl. No.: 822,655

[22] Filed: Aug. 8, 1977

[30] Foreign Application Priority Data

Aug. 6, 1976 [GB] United Kingdom ............... 32780/76

[51] Int. Cl.² .......................... B23B 3/04; B23B 13/12
[52] U.S. Cl. ........................................ 82/2.5; 82/2.7; 82/3; 414/15
[58] Field of Search .............................. 82/2.5, 2.7, 3; 214/1.1, 1.2, 1.4

[56] References Cited

U.S. PATENT DOCUMENTS

| | | | |
|---|---|---|---|
| 2,669,345 | 2/1954 | Brown | 82/2.5 |
| 3,200,680 | 8/1965 | Coffin | 82/2.5 |
| 3,525,277 | 8/1970 | Jeanpetre et al. | 82/2.5 |
| 3,626,792 | 12/1971 | Eichenhofer | 82/2.5 |
| 3,680,414 | 8/1972 | Ryswick | 82/2.5 |
| 3,941,256 | 3/1976 | Doe et al. | 82/2.7 |

*Primary Examiner*—Leonidas Vlachos
*Attorney, Agent, or Firm*—Scrivener, Parker, Scrivener & Clarke

[57] ABSTRACT

The particular machine described has a series of main collets mounted in an indexable drum, each main collet having an associated reciprocable feed tube carrying at its rear end a one-way feed collet employing wedging elements in the form of spring-loaded balls carried in inclined bores of the feed collet body, the feed tubes and feed collets being indexed with the main collets and with a reel-type bar holder. When the collets are arranged to feed non-round bar stock each feed collet is keyed to its associated main collet to enable non-rotating bar stock to be introduced into a rotating feed collet from the bar holder, to be rotated by the feed collet, and then fed through the main collet without stopping the main collet. An axially movable and retractable stop is provided at the feeding station to ensure that an adequate length of bar stock is gripped by a main collet during subsequent machining. Each feed collet is formed in two parts which are capable of axial movement apart against spring-biassing to accommodate the axial movement of the stop at the feed station. At the station preceding the feed station an attempt is made to move the feed collet there towards its associated main collet which is in its closed condition. If a bar is present then movement of the feed collet will not be permitted, but if movement is allowed due to the absence of a bar this is indicated to the machine operator so that the operator can load a new bar into that feed collet. All of the machine mechanisms associated with feeding bar stock are drived from the principal prime mover of the machine. It is unnecessary to provide an automatic mechanism for feeding the bar-loader.

26 Claims, 10 Drawing Figures

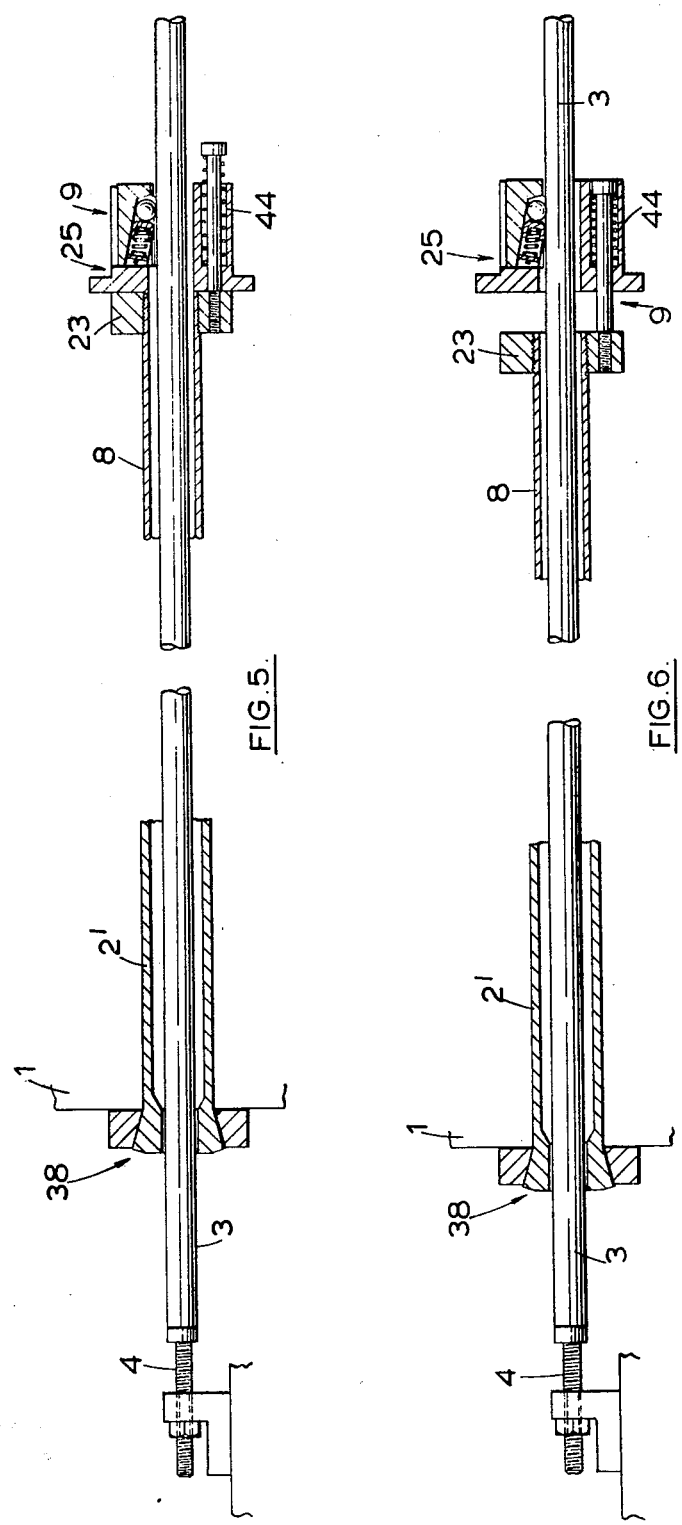

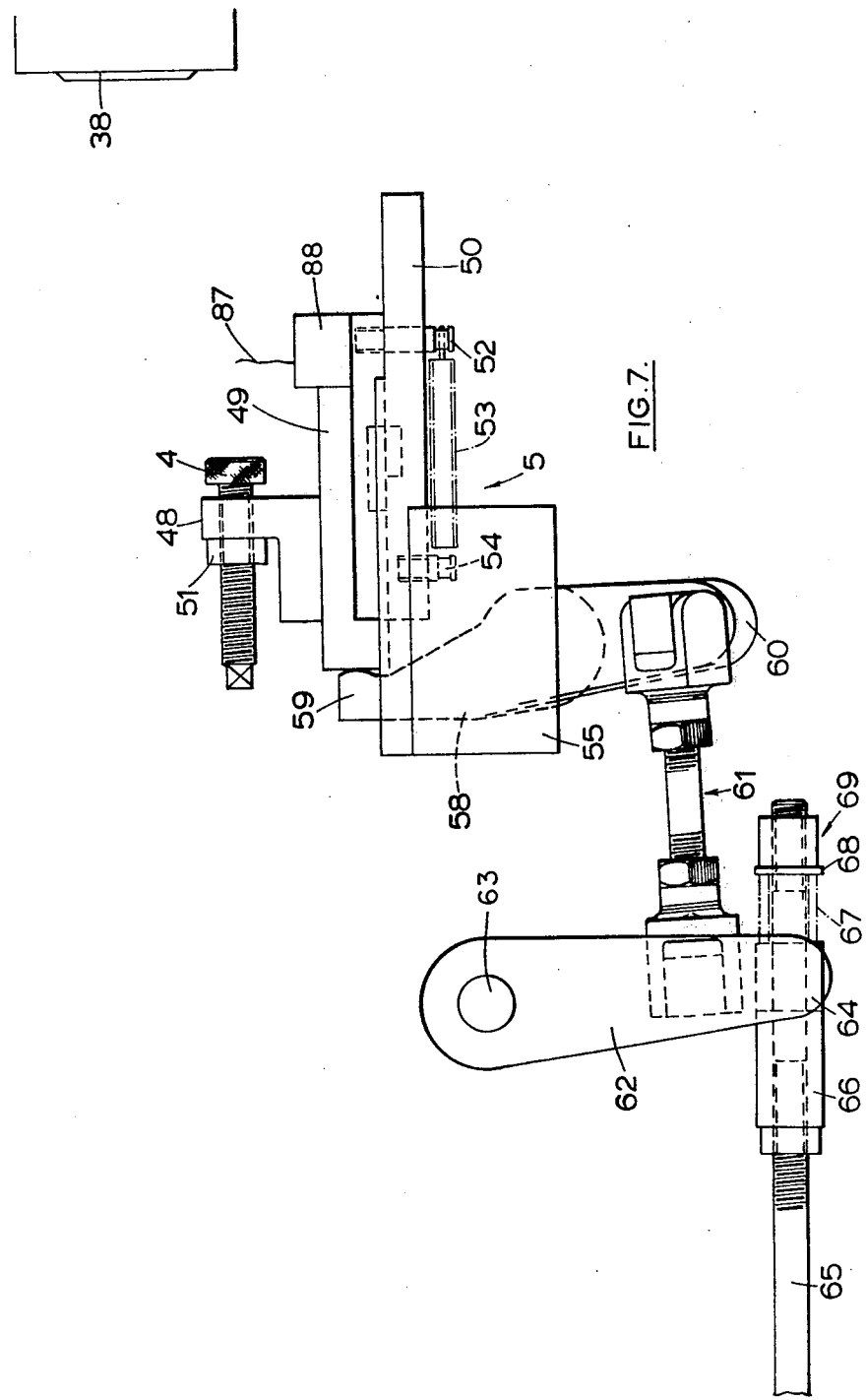

AUTOMATIC MACHINE TOOL

SPECIFIC DESCRIPTION

This invention relates to an automatic machine tool of the kind comprising at least one rotatable main collet adapted to hold bar stock during turning or other machining operations, and a respective feed tube axially aligned with each main collet and through which bar stock is arranged to be fed automatically to the main collet by a respective feed collet associated with each feed tube.

There may be only a single main collet and feed tube, but the invention is particularly applicable to machines of the multi-spindle type in which a series of main collets with their associated feed tubes are carried by a rotary head which is indexed angularly step by step to carry bars through a corresponding series of work stations.

It is desirable that the main collet or collets should be kept rotating during the cycle of machine operations. Accordingly it has been proposed to utilise in a multi-spindle machine a one-way feed chuck incorporating balls as wedging elements, each feed chuck being mounted on the end of the respective feed tube that is remote from the respective main collet. In one proposed construction a cone clutch is employed between a sub-collet housed in the main collet and the feed chuck for use with non-round section bar such as hexagon or square section bar. During feeding of bar by the feed chuck, the feed collet is stationary, and the sub-collet is jogged round by the clutch to align the jaws of the sub-collet with the non-rotating bar stock, and the clutch is then engaged to rotate the sub-collet.

The provision of such a clutch adds to the complexity and cost of such a machine.

The previously proposed machine also necessitates the provision of a complex and expensive magazine for the bars with its associated feed mechanism. When a new length of bar stock is required by one of the feed tubes it is necessary for the front end of the new bar to be positioned accurately to allow the non-rotating feed collet to be retracted over the front end of the new bar.

The various aspects of the invention enable all of the mechanisms of the machine associated with feeding of the bar stock to be driven by the principal prime mover of the machine so that the cost of additional prime movers is avoided, and synchronisation of all the mechanisms is readily achieved.

According to one aspect of the present invention in an automatic machine tool of the kind set forth in which the main collet is adapted to receive non-round bar stock the or each feed collet is located at or adjacent to the end of the respective feed tube remote from the respective main collet, the feed collet is provided with at least one wedging element associated with a respective wedge surface, the arrangement being such that the feed collet is movable over non-round bar stock in the direction away from the main collet but on movement of the feed collet in the opposite direction each wedging element is wedged between the bar and the respective wedge surface to grip the bar, and each feed collet is keyed against angular movement relative to the respective main collet.

It will be appreciated that such a machine is capable also of accepting round bar stock.

Any suitable means may be used for keying the feed collet to the respective main collet.

Such a machine can be made to accept the end of a length of non-rotating bar stock pushed into the feed collet whilst the feed collet and associated main collet are rotating at their normal machining speeds, to accelerate the bar to the speed of rotation of the collets, and then to allow feeding of the bar through the main collet. Thus no time is lost through stopping the machine to insert a new bar into the feed collet, and time is not lost through the need to re-orientate the main collet and feed collet for each new bar.

Thus according to a second aspect of the invention a method of loading a length of bar stock into the feed tube and main collet of a machine in accordance with the first aspect of the invention comprises introducing one end of a length of bar stock into one of the feed collets, or the feed collet, whilst the feed collet is rotating relative to the length of bar stock through the main collet.

The bar stock may be of round or non-round section.

In order to enable pick-up of non-rotating bar stock the bearing elements of the feed collet must be capable of sufficient movement to enable them to pass over the projecting edges of non-round bar whilst the bar is being accelerated to the speed of the collet after which the bearing elements seat themselves against the flats on the bar.

Preferably adjustment means are incorporated to enable the angular position of each feed collet relative to the respective main collet to be adjusted and set.

Preferably the machine is provided with a bar holder comprising a respective guide or guides each of which is permanently aligned with the respective feed collet.

For safety reasons each guide preferably comprises a bar-holding tube of a length which is such that when a length of bar-stock is being introduced into a feed collet the rear end of the bar is contained within the tube and cannot therefore be held by an operator. The operator may simply push the length of bar-stock into the rotating feed chuck by pushing it with a further bar or suitable tool which he or she inserts into the rear end of the bar-holding tube. Alternatively the bar-stock may be thrown into the feed collet by the operator.

With a multi-spindle machine the bar holding tubes are conveniently mounted in a reel as is known.

Although the machine may be provided with a magazine into the bar holder it is a major advantage of the present invention that such additional equipment is not essential.

A feed collet has been previously proposed in which a series of balls or rollers are guided in longitudinal slots in a radially inner sleeve, and a radially outer sleeve mounted on said inner sleeve is provided with an internal frustro-conical ramp surface engaged by the balls or rollers which become trapped between the ramp surface and a bar passing through the sleeves when the outer sleeve is moved relative to the bar in one direction, but which permit movement of the outer sleeve over the bar in the opposite direction.

In the Complete Specification of our Patent Application Ser. No. 822,654 of even date entitled 'Feed Collet for an automatic machine tool', and now abandoned, we have described and claimed a feed collet for a machine tool comprising a collet body defining a bore to receive bar stock and provided with at least one further bore which is inclined with respect to the axis of said bore, each further bore breaking into the surface of the body defining said bore, a respective wedging element located in each further bore being biassed towards said bore by respective resilient means.

In a preferred construction there are a plurality of further bores which are angularly spaced about the axis of said bore, and each wedging element comprises a bearing element capable of rolling in the respective further bore.

Preferably each feed collet of the machine in accordance with the first aspect of the invention is in accordance with the invention set forth in the previously mentioned Complete Specification. A feed collet of the kind referred to in the immediately preceding paragraph is particularly suited to receiving stationary bar stock whilst rotating at speed, since it is relatively easy with such a feed collet to facilitate the movement of the balls which is necessary, and since the bearing elements can be arranged to have a relatively high surface area of contact with the effective wedge surfaces of the collet to bear the high forces involved.

Preferably the body of each feed collet incorporates a plurality of jaw elements which are adjustable radially of the collet, and each of said further bores is provided in a respective one of the jaw elements.

Such a feed chuck may be provided with sufficient adjustment of the jaws to accept the full range of bar sizes which can be accommodated by the main collet. When the invention is applied to a conventional machine which normally uses feed fingers, then replacement of the feed fingers by such a feed collet may increase the effective capacity of the main collet when the capacity is limited by the feed fingers.

According to a third aspect of the invention an automatic machine tool of the kind set forth is provided with a stop assembly comprising a stop which is adapted to be moved axially towards a main collet located at a feed station, and the feed collet comprises first and second parts which are axially movable relative to each other against spring biassing, the first part being secured to the respective feed tube, and the second part being provided with at least one wedging element associated with a respective wedge surface of the second part, the arrangement of the second part being such that the second part is movable over bar stock in the direction away from the main collet but on movement of the second part in the opposite direction each wedging element is wedged between the bar and respective wedge surface to grip the bar.

The use of an axially movable stop permits overfeeding of the bar against the stop located in its position remote from the main collet so that if a bar end portion that is too short to be gripped effectively by the main collet is fed against the stop it will have left the main collet and may be ejected.

Preferably the stop carries a resiliently biassed facing stop which is adapted to eject a short bar end portion fed through the main collet and act as an abutment for positioning the forward end of the following bar.

Preferably each wedging element comprises a bearing element.

Preferably the second part of each feed collet is spaced further from the associated main collet than is the first part, the first and second parts being resiliently biassed towards each other.

When the second part is adapted to receive non-round bar stock the arrangement of the first and second parts is preferably such that they are non-rotatable relative to each other.

The stop assembly is preferably arranged such that the stop is retractable to a position displaced from the axis of a main collet located at the feed station.

When the stop is retractable the axially fixed member on which the stop is mounted is preferably provided with a finger which is arranged to sweep across the space between the stop and the main collet during retraction of the stop to test whether or not a bar is held in the correct axial position for subsequent machining.

The finger may be arranged to actuate a switch which stops the machine in the event that a bar has not been correctly positioned axially.

A machine incorporating the various preferable features of the stop is capable of fully utilising lengths of bar stock, as compared with conventional machines where a length of bar stock may be prematurely replaced to ensure that a short component is not produced. The following aspect of the invention also helps to reduce wastage of bar stock.

According to a fourth aspect of the invention an automatic machine tool of the kind set forth is provided with means to detect whether or not a feed collet is engaged with a length of bar stock to help avoid producing a short component.

In a multi-spindle machine in which a series of main collets are indexed in turn through a series of work stations, means are preferably provided to test whether or not a feed collet is capable of being moved towards the respective main collet at a test location where that main collet is in its closed position. If a bar is present at this location in the relevant feed tube it will be gripped at its forward end by the closed main collet and, since the feed collet is not movable towards the main collet over a stationary bar, the presence of the bar may be detected by the inability to move the feed tube.

When, as is usual, the feed mechanism controlling movement of the feed collets is arranged to prevent movement of the feed collets towards the main collets except during the feed action at a feed station, it is necessary for the feed mechanism to be arranged also to permit momentary forward movement of a feed collet at the test location to test for the presence of a bar.

When the feed action is brought about by a cam then the cam may be suitably modified to permit the movement of the feed collet at the test location.

Preferably the means for testing at the test location whether or not the feed collet located there is capable of forward movement comprises a roller which is resiliently-loaded towards the feed collet but is normally held out of action by the feed mechanism, the roller being released to engage with the feed collets when the feed mechanism permits forward movement of the feed collet at the test location.

Forward movement of the feed collet at the test location is preferably arranged to actuate an indicator device to attract the attention of the machine operator to the need for a new length of bar-stock to be loaded into that feed collet, the indicator device continuing to operate until it is deactivated by the operator or by loading of a new bar into the feed collet.

Preferably forward movement of the feed collet at the test location is arranged also to prevent feeding from the associated feed tube when it is indexed to the feed station until a new length of bar-stock has been introduced into the feed tube. This enables the machine to continue to operate without any pause, and helps to prevent the production of a short component.

The various aspects of the invention enable all of the mechanisms of the machine associated with feeding of the bar stock to be driven by the principal prime mover of the machine so that the cost of additional prime movers is avoided, and synchronisation of all the mechanisms is readily achieved.

An automatic multi-spindle machine tool coupled to a bar holder and in accordance with the various aspects of the invention will now be described by way of example only, with reference to the accompanying drawings in which.

Figure 1:
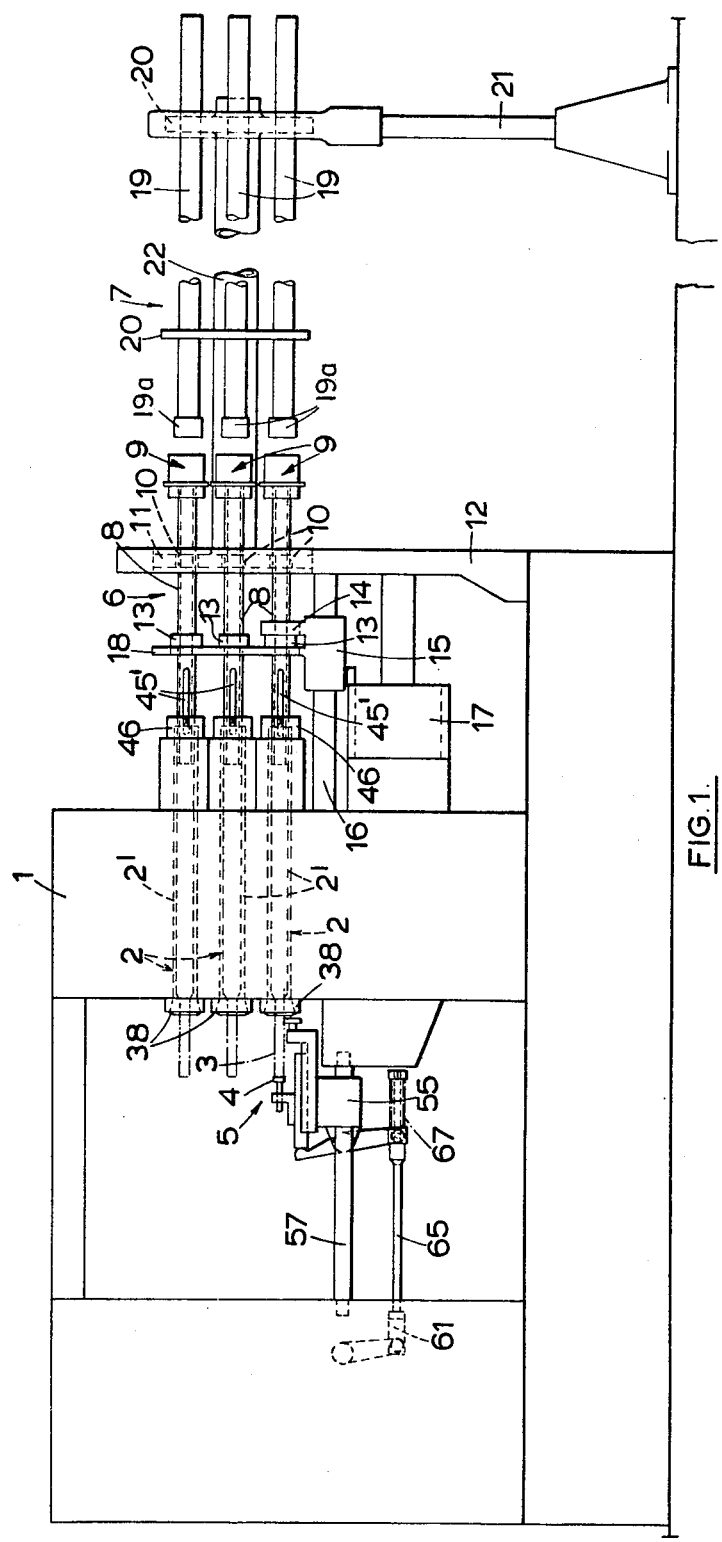
FIG. 1 is a diagrammatic side elevation of the machine tool and bar holder which is of the reel type.
Figure 8:
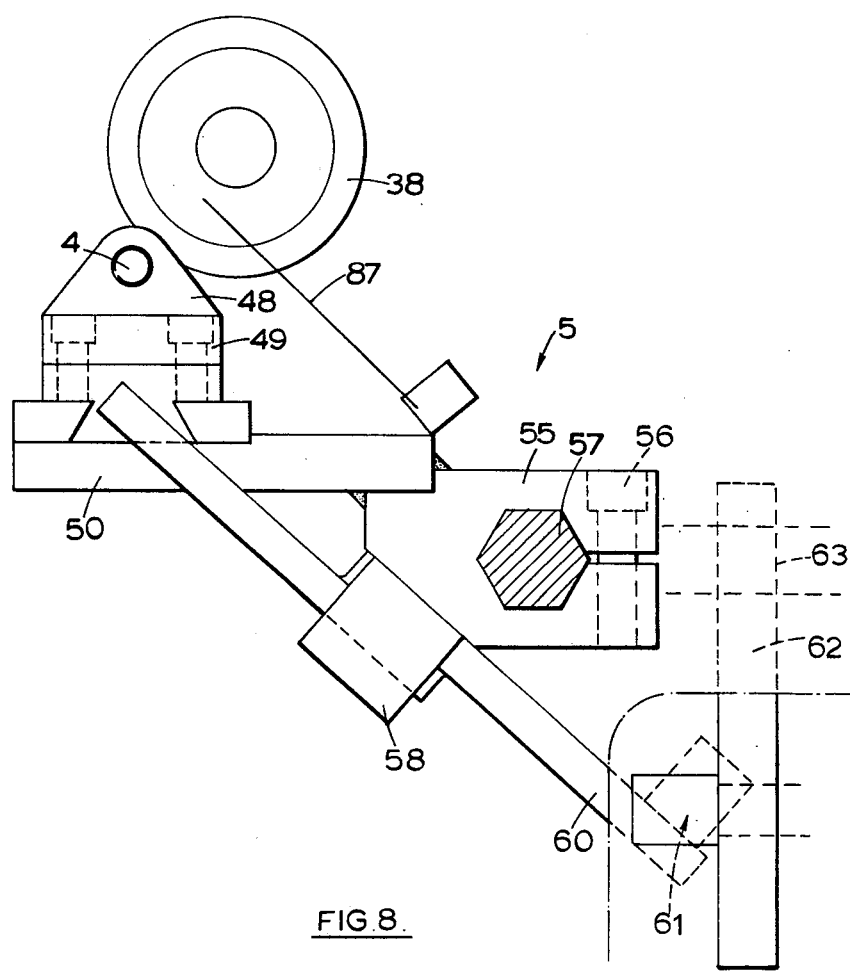
Figure 9:
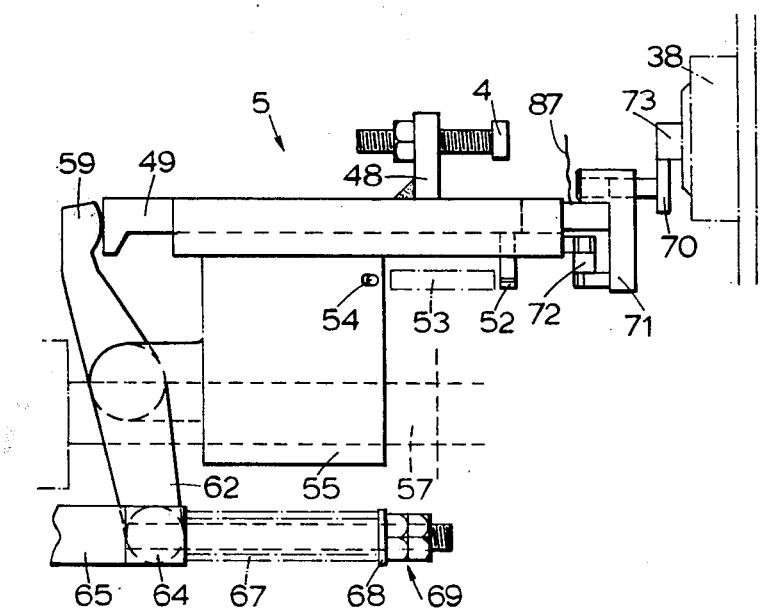
Figure 10:
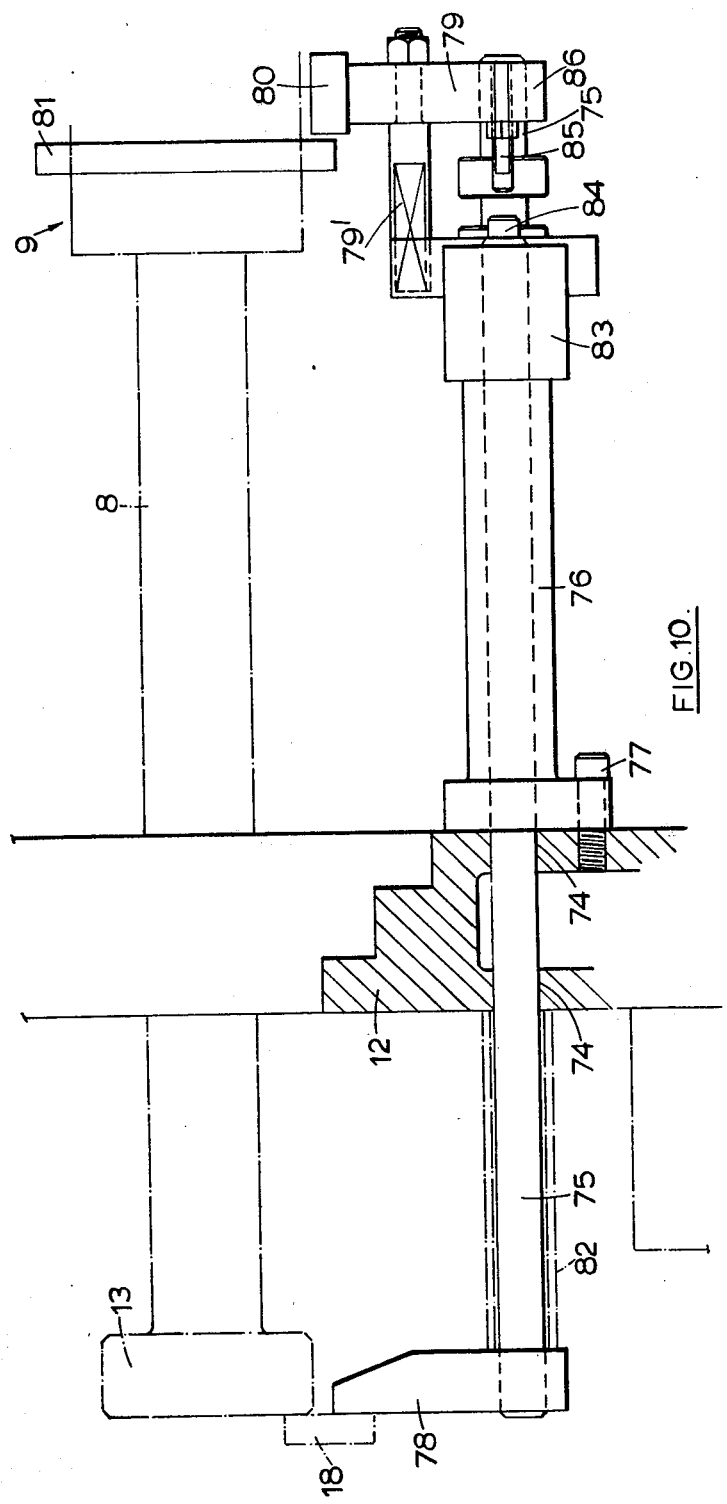

FIGS. 5 and 6 are longitudinal cross-sectional views of one of the main collets in position at the feed station with its associated feed tube and feed collet and with a length of bar-stock abutting a retractable and axially movable stop, the stop being shown in its forward axial position in FIG. 5 with the main collet released, and in FIG. 6 in its subsequent rearward axial position with the main collet closed and with the feed collet extended by retraction of the bar stock relative to the feed tube;

FIG. 7 is a side elevation of a modification of the retractable stop assembly of the machine of FIG. 1 with the stop shown in its retracted position relative to a main collet located at the feed station;

FIG. 8 is an end elevation of the retractable stop assembly of FIG. 7 looking towards a main collet located at the feed station, the stop being shown in its retracted position;

FIG. 9 is a view similar to FIG. 7 of the retractable stop assembly of the machine of FIG. 1 provided with a facing stop in the form of a roller mounted on a resiliently biassed pivoted arm, the roller being shown in engagement with bar-stock projecting from a main collet located at the feed station; and FIG. 10 is a longitudinal cross-sectional view of a mechanism located at the station immediatly preceding the feed station for determining whether or not the feed collet located at that station is engaged with a length of bar-stock.

Referring to FIG. 1 the machine tool comprises a headstock 1 of conventional design in which is rotatably mounted a spindle drum carrying six spindles 2 of which only three are shown for convenience in the drawing. The reel drum is indexable to take the spindles through six stations at some of which various machining operations are carried out by tools which are automatically controlled in conventional manner. The lowest of the three spindles shown in the drawing is located at the feed station at which bar-stock 3 is fed against an axially movable and retractable stop 4 of a stop assembly 5 by feed means 6 from a bar holder 7.

The feed means comprises six axially movable and rotatable feed tubes 8 each of which is keyed to a respective spindle tube 2 at its forward end, is provided with a respective feed collet 9 at its rear end, and is supported in a respective bushing 10 of a feed tube disc 11 rotatably mounted in a rigid stand 12 and connected to the reel drum by a shaft, not shown, for rotation therewith. Feeding is achieved by reciprocation of the feed tube that is located at the feeding station, the respective feed collet 9, as will be explained hereinafter, gripping bar-stock contained therein during forward movement of the feed tube. Each of the feed tubes 8 is provided, in known manner, with an integral external collar 13 which, when it is positioned at the feed station, is engaged at its rear by a feed finger 14 secured to a block 15 reciprocable on a slide 16, reciprocation of the block 15 being controlled by a drum cam 17. The block 15 also carries a ring 18 which encircles the feed tubes and engages with the forward face of the collar 13 of the feed tube located at the feed station for effecting retraction of that feed tube after it has been moved forwards by the feed finger 14.

The collars 13 in their retracted positions are supported in known manner in cut-outs in the periphery of a disc, not shown, secured to the shaft connecting the reel drum to the feed tube disc 11.

The bar holder 7 comprises six parallel bar holding tubes 19 carried in a pair of spaced apart discs 20 rotatably carried by a support 21 and secured to a tubular shaft 22 which itself is secured to the feed tube disc 11 for rotation with the feed tube assembly and spindle drum. The forward end 19a of each bar holding tube is aligned with a respective feed collet 9 and is spaced axially from the feed collet when the collet is in its rearward position.

The feed collets 9 will now be described with reference to FIGS. 2 and 3. A more detailed description of the collet is to be found in the Complete Specification of our co-pending patent application Ser. No. 822,654 entitled "Feed collet for an automatic machine tool" of even date. Each feed collet 9 comprises a first part in the form of a split collar 23 secured to the extremity of the respective feed tube 8, and a second part 25 which is axially movable relative to the first part and is resiliently biassed towards the first part. The second part comprises a cylindrical block 26 provided with an axial bore 27 and with three equi-angularly spaced radial slots 27a which extend axially from the rear end of the block 26 for about three quarters of its length, a respective jaw assembly 28 being retained in each slot by a respective set-screw 29.

Each jaw assembly 28 comprises a substantially oblong-rectangular jaw body 30 provided with an inclined bore 31 which breaks into the radially inner face of the jaw body 30. A respective ball 32 is received with clearance in the bore 31 and is biased rearwardly by a respective coiled compression spring 33 of which the rear end is received within the recess of the tappet and the front end engages a washer 34 abutting a pin 35 secured in body 30. The retracted position of each ball 32 is controlled by an axial screw 33', and the adjustment of this screw can be used to minimise bar marking. Each ball 32 constitutes a wedging element.

It will be appreciated that the radially outer surfaces 32a of the bores 31 constitute ramp surfaces with which the balls 32 co-operate when the balls are engaged with bar-stock inserted into the bore 27 of the feed collet.

Each jaw body 30 is provided on one side face with a series of axially extending splines or teeth 36 which engage with a complementary series of teeth 37 formed on one side face of each slot, the teeth being held interengaged in use by the respective set screw 29, but permitting substantial radial adjustment of the jaw assemblies on release of the set screw 29 to accommodate a wide range of cross-sectional dimensions of bar-stock.

The feed collet 9 shown in the drawings is suitable for use with round or hexagon bar-stock, three of the flats of which will be engaged by the respective balls. A different number of jaws may be appropriate for other cross-sections of bar-stock.

Forward movement of the feed chuck 9 at the feed station, when a length of bar stock is extending through the chuck, results in forward movement of the bar stock which is gripped by the balls 32 due to the balls becoming wedged between the bar-stock and the ramp surfaces 32a. During subsequent rearward movement of the second part 25 the balls release the bar-stock to enable the feed chuck 9 to retract over the stationary bar-stock which is held by the main collet 38, FIG. 1, of the respective spindle 2.

Figure 4:
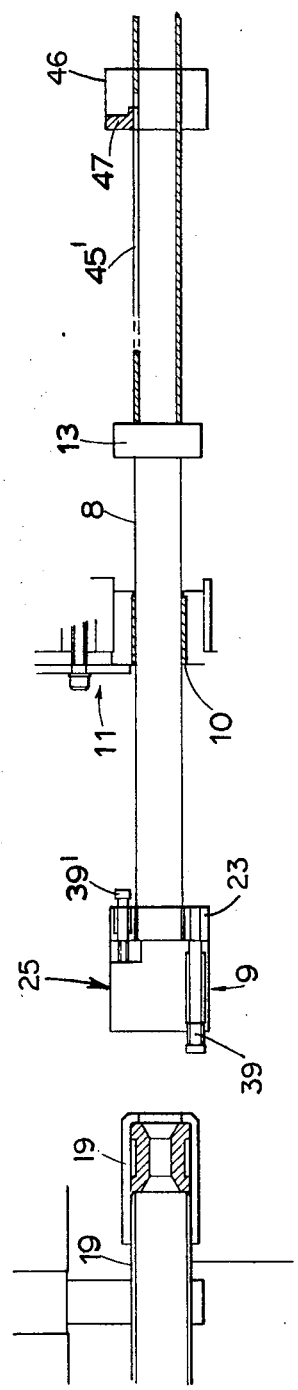
FIG. 4 is a longitudinal cross-section of one of the feed tubes together with its associated feed collet and the adjacent end of the corresponding bar holding tube of the bar holder.

The first and second parts, 23 and 25 respectively, of the feed chuck are held against relative angular movement by three equi-angularly spaced headed pins 39 which are each slidably received in a respective stepped bore 40 in block 26 and each have a reduced end 41 threadedly secured in a respective screw hole 42 in collar 23 and locked in position by a set screw 43. A respective coiled compression spring 44 in each bore 40 acts between the step in the bore and the head of each pin 39 to bias together the first and second parts 23 and 25 of each feed chuck. As shown in FIG. 4 a headed pin 39' may be provided to limit axial movement of the two parts. Pin 39' has a threaded end secured in part 23.

Figure 2:
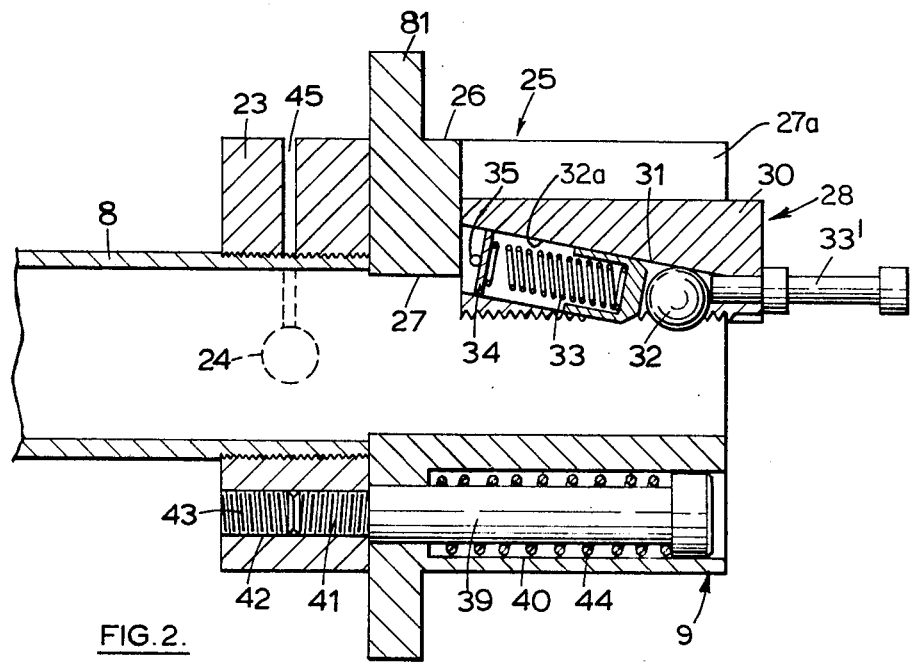
FIG. 2 is a longitudinal cross-section of one of the feed collet of the machine tool secured to the rear end of a feed tube taken substantially on line 2—2 of FIG. 3.
Figure 3:
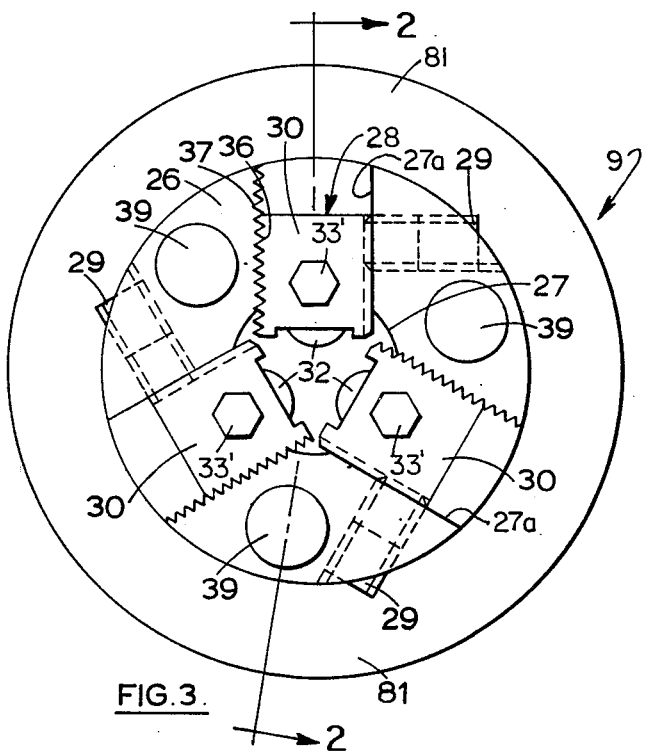
FIG. 3 is an end view of the feed collet looking from the right in FIG. 2.

Each collar 23 is formed with a slit 45 which terminates in a diametrically extending bore 24 and which facilitates clamping of the collar onto the respective feed tube, two of the set screws 43, the two which are not shown in FIG. 2, acting to widen the slit and thereby urge the forward end of the collar 23 radially inwardly against the feed tube 8. Slackening of those two screws 43 enables the angular position of the feed collet 9 to be adjusted relative to the feed tube 8, and, since the feed tube 8 is keyed to the respective main collet 38, relative to the main collet, to enable a length of non-round bar-stock to be gripped simultaneously by a feed collet 9 and by the associated main collet 38.

The balls 32 of each feed collet 9 are capable of sufficient movement longitudinally of bores 31 to enable non-round bar-stock, such as hexagon bar-stock, to be introduced into the rotating feed collet when the bar-stock is not initially itself rotating. Thus, providing that the feed collet 9 has been correctly orientated relative to the associated main collet 38, the bar can be fed by the rotating feed collet 9 to be received by the main collet 38, which therefore does not require to be stopped for the introduction of a new length of non-round bar-stock.

In a modification, the pins 39 are lengthened as shown in FIG. 4 to protrude from the bores 40 and facilitates their tightening.

The keying of the feed tubes 8 to the respective main collets 38 will now be described with reference to FIGS. 1 and 4. Each of the feed tubes 8 is slidably received at its forward end within the rear end of the respective spindle tube 2' and is formed adjacent to that end with an axially extending slot 45' of length equal to the feed travel of the feed tube 8. A respective collar 46 is secured over the rear end of each spindle tube 2' and is provided with a radially inwardly extending key 47, shown in FIG. 4, which is slidably received in slot 45'.

As has been previously described the keying of the feed collets 9 to their associated main collets 38 together with the use of spring-loaded balls or other bearing elements in the feed chucks enables non-rotating non-round bar-stock to be picked up by the rotating feed chuck. To enable this operation to be performed manually without danger to the operator the bar-holding tubes 19 are made of a length greater than that of the bar-stock to be fed. When it is desired to introduce a new length of bar-stock into a rotating feed collet 9 the operator simply loads the bar-stock into the empty tube 19 and then pushes it from behind into the feed chuck with a suitable bar or tool. Alternatively the operator may load the bar-stock partially into the tube 19 and may then throw it into the feed collet.

It will be appreciated that suitable automatic means could be provided for loading the bar holder and for feeding the bars from the bar holder into the feed collet, but it is an advantage of the construction being described that such expensive auxiliary equipment is not essential.

The function of the retractable and axially movable stop 4 will now be described with reference to FIGS. 5 and 6. The mechanism for effecting movement of the stop will later be described. The stop 4 is located in its fully forward position axially aligned with the main collet 38 located at the feed station when the associated feed tube 8 is moved forwards by the feed finger 14, thereby moving the bar-stock 3 forwards through the open collet 38 to abut the stop 4. As shown in FIG. 5, the two parts 23 and 25 of the feed collet 9 are then engaged with each other owing to the biasing of the compression springs 44. Stop 4 is then moved rearwardly to push back the bar-stock 3. Since the feed finger is maintained in an advanced position during the rearward movement of the stop, the feed tube 8 and first part 23 of the feed collet 9 are maintained in their forward positions, whilst the second part 25 of the feed collet 9 is moved rearwardly by the bar 3 against the biassing of springs 44 which become further compressed. Thus the rearward movement of the bar is accommodated by the relative axial movement between the two parts, 23 and 25, of the feed collet which, however, still retain their relative angular positions so that when, following retraction of the bar-stock 3, the main collet 38 closes onto the bar-stock it is correctly orientated to grip bar-stock that is non-round.

The reason for over-feeding and push back of the bar-stock is to ensure than an adequate length of bar-stock is present in the jaws of the main collet 38 during the subsequent machining operations. If only a very short length of bar-stock is present in the main collet prior to the feed movement it will be fed beyond the main collet and will fall from the main collet, or preferably be ejected by an optional facing stop to be described hereafter.

The mechanism for effecting movement of the stop 4 will now be described. For convenience, the modified assembly of FIGS. 7 and 8 will be described before the mechanism that is utilised in the machine of FIG. 1. Stop assembly 5 comprises the stop 4 in the form of a screw extending through an upstanding lug 48 on a slide block 49 having a dovetail sliding engagement with a fabricated guide assembly 50. A locking nut 51 is provided on the screw 4. Guide assembly 50 is provided with a slot, not shown, which is vertical in FIG. 8 and extends forwardly from its rear end to accommodate axial movement of a peg 52 extending downwardly in FIG. 7 from the slide 49 and to which the rear end of a coiled tension spring 53 is attached for biassing the slide forwardly, the forward end of the spring 53 being attached to a further peg 54 secured to the underside of guide assembly 50.

Guide assembly 50 is welded to a split clamp 55 secured by a clamp screw 56 to a hexagon shaft 57 which is rotatably carried by the main body of the machine. Angular movement of shaft 57 in a clockwise direction in FIG. 8 brings the stop 4 into axial alignment with the main collet 38 located at the feed station. The drive for shaft 57 is preferably derived from the conventional drive mechanism of the machine so as to be in sequence with the other operations of the machine.

Clamp 55 also pivotally supports a lever 58 which bears at its upper free end 59 against the front end of the slide 49 and has its opposite end 60 connected by a universal joint 51 to an intermediate point in the length of a lever 62 mounted for pivotal movement in a vertical plane on a fixed pivot 63 on the main body of the machine, the universal joint permitting angular movement of the lower end of the lever 58 about the shaft 57 on movement of the stop 4 between its retracted and operative positions. Lever 62 at its free end carries a sleeve 64 mounted on a pull-rod 65 and held in abutment with a further sleeve 66 secured on rod 65 by a strong coiled compression spring 67 backed by a washer 68 and lock-nuts 69. Spring 67 permits some additional forward movement of the stop 4 in the event of a malfunction of the feed means. Forward movement of rod 65 results in rearward movement of the upper end 59 of lever 58 to move the slide 49 and stop 4 to its rearward position against the force of spring 53. On reverse movement of rod 65 stop 4 is moved forwardly by spring 53. The motion of rod 65 is derived from a convenient cam in the conventional drive mechanism of the machine.

It will be understood that after indexing of a main collet 38 to the feed station, rod 57 is turned to bring stop 4 into line with the collet, rod 65 being in its rearward position. Bar-stock is then fed against stop 4, and the stop is then moved rearwardly by forward movement of rod 65. Rod 57 is then turned back in the opposite direction to retract the stop 4 and allow tooling to be brought into position at the feed station. At a subsequent convenient time the rod 65 is moved rearwardly again in readiness for another cycle of operation.

A sweep finger 87 positioned axially in front of the desired retracted position of the bar end is connected to a switch 88 mounted on guide assembly 50 and is arranged to engage with a mis-positioned bar during retraction of the stop 4. The switch 88 may be arranged to stop the machine in the event that a bar has not been moved sufficiently rearwardly during rearward movement of stop 4.

FIG. 9 is an enlarged view of the stop assembly 5 of FIG. 1 in which parts corresponding to those of the assembly of FIGS. 7 and 8 have been given the same reference numbers. In this stop assembly the guide assembly 50 is provided at its rear end with a facing stop in the form of a roller 70 carried by a bell-crank lever 71 pivoted on guide assembly 50 about an axis parallel to that of the collet 38 and biassed by a tension spring 72. When rod 57 is pivoted to bring stop 4 into line with collet 38 after indexing of collet 38 to the feed station, roller 70 is brought into engagement with the portion 73 of bar-stock which remains projecting through collet 38 after the parting operation at the preceding station. If no such projecting portion 73 exists when the collet 38 arrives at the feed station then roller 70 under the force of spring 72 will occupy a position blocking feed of bar through the collet 38, since any feed of material is likely to result in a short component being subsequently produced. Normally a projecting portion 73 will be present and feeding will take place. In the event that a short length of bar-stock is fed through collet 38 to be suspended between stop 4 and the front end of the following length of bar-stock, roller 70 will eject the short length under the force of spring 72 so that it cannot foul the tooling at the feed station.

FIG. 10 shows a mechanism located at the station immediately preceding the feed station for giving an indication to the machine operator when a new length of bar-stock is required to be fed into the feed collet 9 located there and for preventing in the meantime further feed through the associated feed tube 8 when that feed tube is indexed to the feed station. This mechanism is operative in the event that during the preceding feeding action the rear end portion of a bar is brought into the feed tube 8, and on subsequent retraction of the feed collet 9 with the bar-stock gripped by the associated main collet 38 the feed collet 9 moves off the rear end of the bar. The mechanism of FIG. 10 detects at the station preceding the feed station that the collet 9 is not gripping a bar as will now be explained.

At that station the stand 12 is provided with an axial bore 74 through which extends a rod 75 guided in a sleeve 76 secured by a screw 77 to the stand 12. At its forward end the rod 75 is rigidly secured to a finger 78 which abuts the ring 18 of the feed mechanism when the ring 18 is in its rearward position in engagement with the front face of the collar 13 of the feed tube 8 located at that station, as shown in FIG. 10. At its rear end the rod 75 carries a lateral arm 79 supported on peg 79' and on which is mounted a roller 80 which, in the positions of the parts shown in FIG. 10, is spaced slightly from an annular flange 81 provided on the modified feed collet 9. A coiled compression spring 82 is mounted on the rod 75 and acts between the finger 78 and the front face of support 12 to urge forwardly the rod 75 and thus the roller 80. Forward movement is, of course, normally prevented by the stationary ring 18 of the feed mechanism. A limit switch mechanism 83 is mounted on the rear end of the sleeve 76 and has a switch actuator 84 located in line with an adjustable pin 85 carried by an upstanding lug 86 on the inner end of arm 79. The spacing between pin 85 and actuator 84 determines the amount of forward movement of rod 75 that is required to actuate the switch. Switch mechanism 83 is connected firstly to a circuit which operates a flashing light, or other suitable indicator, for drawing the attention of the machine operator, and secondly to a circuit for activating a solonoid, controlling a latch, not shown, which prevents reciprocation of the appropriate feed tube whenever that feed tube is positioned at the feed station. Both of these circuits are arranged to remain activated until they are de-activated by the machine operator after he or she has inserted a fresh bar into the appropriate feed collet.

In order to permit movement of rod 75 in the circumstances outlined above the cam 17 of the machine is arranged to advance momentarily the block 15 and ring 18 by an amount which is slightly greater than the spacing between the pin 85 and the switch actuator 84, this small forward and reverse movement of the ring 18 being arranged to take place before indexing of the spindle drum but prior to the main feed movement at the feed station. On initial forward movement of ring 18 the finger 78 and rod 75 follow it to bring roller 80 into engagement with flange 81 of the rotating feed collet 9. On further forward movement of ring 18 the feed collet 9 will be able to move forwards under the force of the spring 82 acting through roller 80 only if it is not engaged with a bar, since if a bar is present in feed collet 9 the bar will be held at its forward end by the associated main collet 38 at that moment of the cycle to prevent forward movement of collet 9 and actuation of switch 83. The switch mechanism 83 is arranged to be inoperative when the main feed movement is taking place at the feed station.

It will be appreciated that when the switch mechanisms has been actuated to indicate the absence of a bar in a particular feed collet and the latch has been actuated to prevent further feed of that collet the machine continues to operate without pause, production being lost only at the main collet associated with the inactive feed collet until the operator inserts a new bar into the inactive feed collet when production will resume, without pause, at the normal rate.

It will be appreciated that all the functions of the above machine are powered by the machine drive mechanism and that no auxiliary means of power need be provided. This is a considerable advantage since the synchronisation of the various operations is easily maintained and the cost of auxiliary power means is avoided.

Safety means may be incorporated to guard an operator against injury if he is attempting to insert a bar when the bar holder indexes.

For example, a rotatable plate having angularly spaced openings corresponding in number and spacing to the bar-holding tubes may be arranged at the rear end of the assembly. Normally the openings in the plate are out of alignment with the bar-holding tubes. Rotation of the plate to bring the openings into alignment with the tubes operates an interlocking device to prevent the machine from indexing.

In another arrangement a door interlocked with the machine may be provided to prevent the machine from indexing while access to the tubes is permitted.

As an additional refinement angularly spaced switches associated with lights may be mounted in a stationary form around the bar-holder, the switches being actuated by the presence of a bar in a bar-holding tube as the bar-holder rotates, so that the operator is given a visible indication not only that a bar in a feed tube is running out but into which bar-holding tube a fresh bar should be fed.

The switches may be so arranged that all the lights are energised when there are bars in all the bar-holding tubes and the absence of a light indicates that a fresh bar is required and in which bar-holding tubes. Alternatively each light may be energised only when a bar is required in the bar-holding tube with which the switch for that light associates.

With this arrangement there is a considerable saving of the operator's time as no examination of the individual bar-holding tubes is necessary.

I claim:

1. An automatic machine tool of the kind comprising at least one rotatable main collet adapted to hold non-round bar stock during turning or other machining operations, and a respective feed tube axially aligned with each main collet and through which non-round bar stock is arranged to be fed automatically to the main collet by a respective feed collet associated with each feed tube, each feed collet being carried adjacent to the end of the respective feed tube remote from the respective main collet, each feed collet is provided with at least one wedging element associated with a respective wedge surface of the feed collet, the arrangement being such that each feed collet is movable under non-round bar stock in the direction away from the respective main collet but on movement of the feed collet in the opposite direction each wedging element is wedged between the bar and the respective wedge surface to grip the bar, and means permanently keying each feed tube against angular movement relative to the respective main collet.

2. A machine tool as claimed in claim 1 in which there are a plurality of main collets with their respective feed tubes, the main collets being carried by a rotatable head assembly, and the feed tubes being supported for rotation with the head assembly.

3. A machine tool as claimed in claim 2 in which the head assembly is housed substantially within the machine casing, and the feed tubes are located substantially external to the machine casing.

4. A machine tool as claimed in claim 2, in which each of the feed tubes is axially aligned with a respective guide means of a rotatable bar holder which is connected for rotation with the head assembly.

5. A machine tool as claimed in claim 4, in which each of the guide means comprises a respective bar-holding tube which is open at its end remote from the feed collets to enable insertion of bar stock.

6. A machine tool as claimed in claim 1 in which each feed collect is located at the extremety of the respective feed tube.

7. A machine tool as claimed in claim 1 wherein each main collect carries a spindle tube, each feed tube at its end nearest to the respective main collect being slideable within a respective spindle tube associated with a respective main collet.

8. A machine tool as claimed in claim 7, wherein each spindle tube is secured to the jaws of a respective main collet, said keying means connecting each feed tube to a respective spindle tube whereby each of said feed tubes is permanently keyed against said angular movement relative to its respective main collet.

9. A machine tool as claimed in claim 8 wherein each of said keying means comprises a collar carried at the rear end of a respective spindle tube, said collar having a radially inwardly projecting key which is slideably received in an axial slot in a respective feed tube.

10. A machine tool as claimed in claim 1 in which adjustment means are provided to enable the angular position of each feed collet about its axis to be adjusted relative to that of its respective feed tube.

11. An automatic machine tool comprising at least one rotatable main collet adapted to hold non-round bar stock during turning or other machining operations, and a respective feed tube axially aligned with each main collet and through which non-round bar stock is arranged to be fed automatically to the main collet by a respective feed collet associated with each feed tube, each feed collet being carried adjacent to the end of the respective feed tube remote from the respective main collet, means permanently keying each feed tube against angular movement relative to the respective main collet, each feed collet comprising a collet body defining a bore to receive bar stock and provided with at least one further bore which is inclined with respect to the axis of said bore, each further bore breaking into the surface of the body defining said first mentioned bore, a respective wedging element being located in each further bore and being biased towards said first-mentioned bore by respective resilient means, the wall of each further bore constituting said wedge surface.

12. A machine tool as claimed in claim 11, in which each wedging element comprises a bearing element.

13. A machine tool as claimed in claim 12, in which there are three bearing elements which are equally spaced angularly about the axis of the feed collet, and each bearing element consists of a ball-bearing.

14. A machine tool as claimed in claim 11, in which there are a plurality of further bores which are angularly spaced about the axis of said bore.

15. A machine tool as claimed in claim 14, in which the collet body incorporates a plurality of jaw elements which are adjustable radially of the feed collet, and each of said further bores is provided in a respective one of the jaw elements.

16. A machine tool as claimed in claim 11 in which each feed collet is capable of accepting bar of the maximum cross-sectional dimensions that can be accepted by the respective main collet.

17. An automatic machine tool of the kind comprising at least one rotatable main collet for holding bar stock during a machining operation, and a respective feed tube axially aligned with each main collet, a respective feed collet associated with each feed tube, a stop, a feed station, means for moving said stop axially towards a main collet located at said feed station, said feed collet having first and second parts which are axially movable relative to each other, the second part of each feed collet being spaced further from the respective main collet than is the respective first part, resilient means acting between said first and second parts to urge said parts towards each other, and means securing said first part to a respective feed tube, said second part comprising a one way gripping device for gripping bar stock when said second part is moved towards said main collet.

18. A machine tool as claimed in claim 17 wherein said one-way gripping device comprises at least one wedging element, and a respective wedge surface.

19. A machine tool as claimed in claim 18 in which each wedging element comprises a bearing element.

20. A machine tool as claimed in claim 17 including means for retracting said stop laterally from the axis of a main collet located at said feed station.

21. A machine tool as claimed in claim 20 including a prime mover, first drive means connecting said prime mover to said main collet, and second drive means connecting said prime mover to said means for retracting said stop and to said means for axially moving said stop.

22. A machine tool as claimed in claim 20 in which sweep finger is connected to the stop for engagement with a bar projecting from the main collet at the feed station on retraction of said stop.

23. A machine tool as claimed in claim 20 including a facing stop connected to said stop.

24. a machine tool as claimed in claim 17, in which said main collet and said second part are adapted to receive non-round bar stock, and including means keying said first part against angular movement to said main collet, and further means keying said first and second parts against angular movement relative to each other.

25. A machine tool as claimed in claim 24, in which said further key means comprises a plurality of angularly spaced and axially extending pins.

26. A machine tool as claimed in claim 25, in which said resilient means comprises respective coiled compression springs mounted on said pins.

* * * * *

UNITED STATES PATENT AND TRADEMARK OFFICE
CERTIFICATE OF CORRECTION

PATENT NO. : 4,187,748
DATED : February 12, 1980
INVENTOR(S) : Richard F. Evans

It is certified that error appears in the above-identified patent and that said Letters Patent are hereby corrected as shown below:

[73] Assignee: Kenmar Export Limited, Solihull, England

*Signed and Sealed this*

*Twenty-second* Day of *July 1980*

[SEAL]

Attest:

SIDNEY A. DIAMOND

*Attesting Officer*   *Commissioner of Patents and Trademarks*

UNITED STATES PATENT AND TRADEMARK OFFICE
CERTIFICATE OF CORRECTION

PATENT NO. : 4,187,748

DATED : February 12, 1980

INVENTOR(S) : Richard F. Evans

It is certified that error appears in the above—identified patent and that said Letters Patent is hereby corrected as shown below:

Sheets 2 and 3 of the drawings are deleted to appear as per attached sheets.

Signed and Sealed this

Third Day of March 1981

[SEAL]

Attest:

RENE D. TEGTMEYER

Attesting Officer     Acting Commissioner of Patents and Trademarks